INVENTORS
HANS NEU
WILLIAM M BARDEAU
BY
Agent

United States Patent Office 3,490,823
Patented Jan. 20, 1970

3,490,823
WARMING OVEN
Hans Neu, Weston, Ontario, Canada, and William M. Bardeau, 44 Princess Margaret Blvd., Islington, Ontario, Canada; said Neu assignor to said Bardeau, Islington, Ontario, Canada
Filed Dec. 11, 1967, Ser. No. 689,415
Int. Cl. A47b 88/12
U.S. Cl. 312—270  9 Claims

ABSTRACT OF THE DISCLOSURE

A warming oven consisting of a heated enclosure in which a drawer reciprocates. The drawer is mounted by cam and follower means in such a way that the drawer moves rearwardly and upwardly over the final portion of its closure to attain its uppermost position when fully closed. The drawer carries an open-topped container, and a lid is mounted within the enclosure for adjustment between one position in which it seals the container when the drawer is closed, and another position in which it is spaced from the container when the drawer is closed.

---

This invention relates to a warming oven intended to keep food products, such as freshly-baked rolls, etc., at a warm temperature until ready to be consumed.

One object of this invention is to provide a warming oven in which the items to be warmed either can be completely enclosed, and thereby maintained at their original moisture content, or can be partly exposed to air circulation, and thereby dried or "crisped."

Accordingly, this invention provides a warming oven comprising: a frame, a drawer supported by said frame, cam and follower means mounting the drawer on the frame, the cam and follower means being such that the drawer moves rearwardly and upwardly over the final portion of its closure to attain its uppermost position when fully closed, an open-topped container in said drawer, a container lid carried by said frame, said lid being adjustable between a first position in which it substantially seals the said container when the drawer is fully closed, and a second position in which it is spaced from said container when the drawer is fully closed, and means for heating said container.

One embodiment of this invention is shown in the accompanying drawings, in which like numerals denote like parts throughout the several views, and in which.

Figure 1:
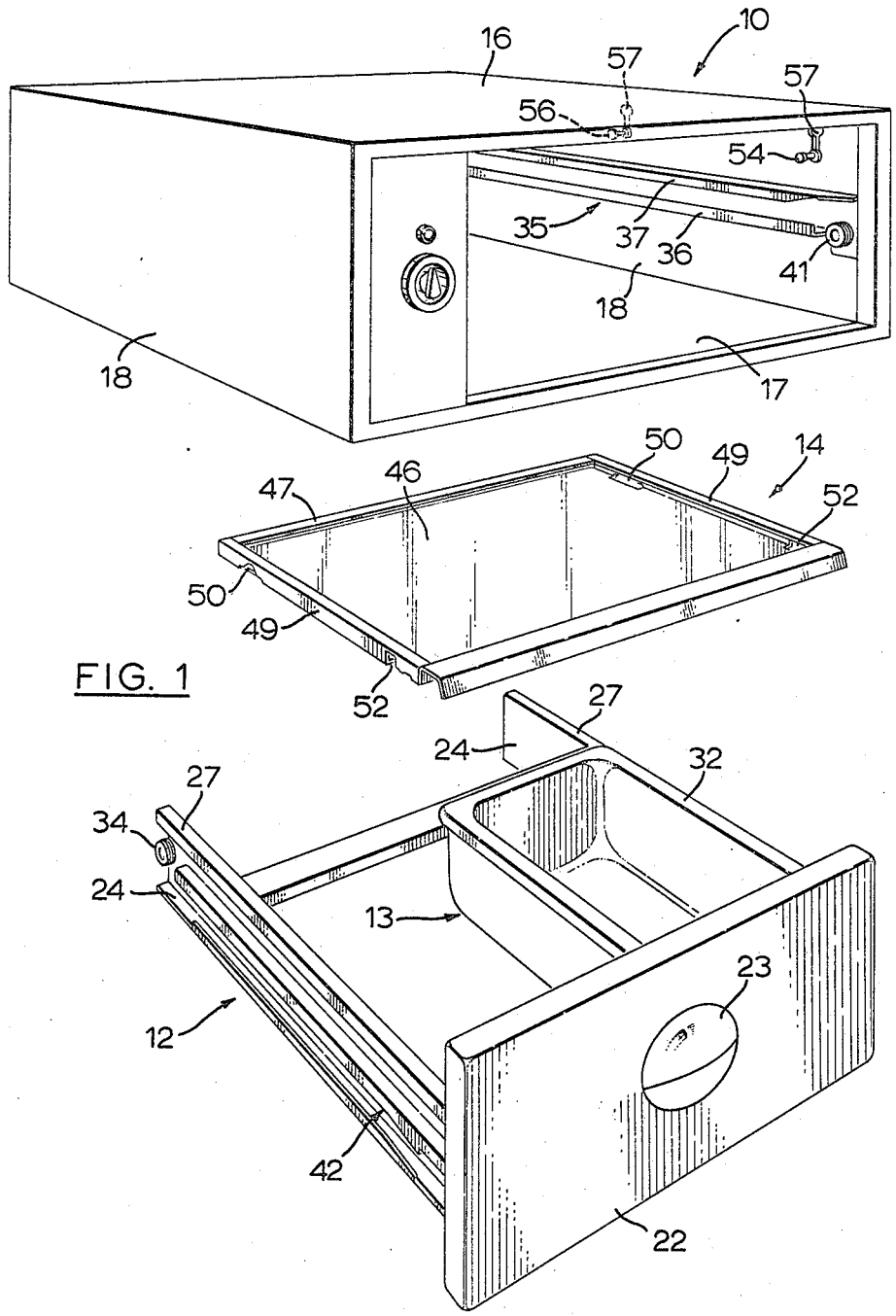
FIGURE 1 is a perspective view of the three major components of this invention, separated vertically from one another.

Turning first to FIGURE 1, the warming oven of this invention is seen to consist generally of three components: a frame 10 shown here in the form of an enclosure; a drawer 12 supporting at least one open-topped pan 13; and a lid 14 adapted to cover and seal the pan 13.

Figure 2:
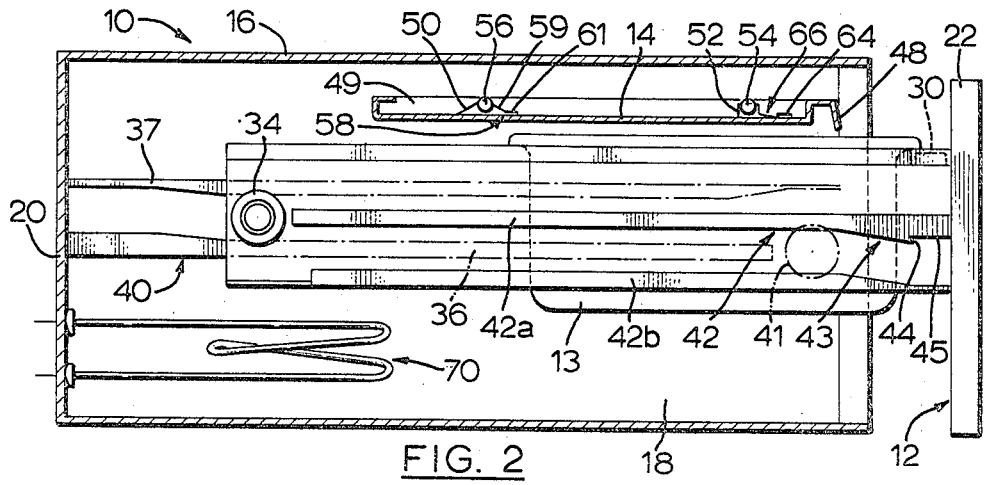
FIGURE 2 is a vertical sectional view taken through the warming oven of this invention parallel to the direction of drawer reciprocation, with the drawer in a partly open position.
Figure 3:
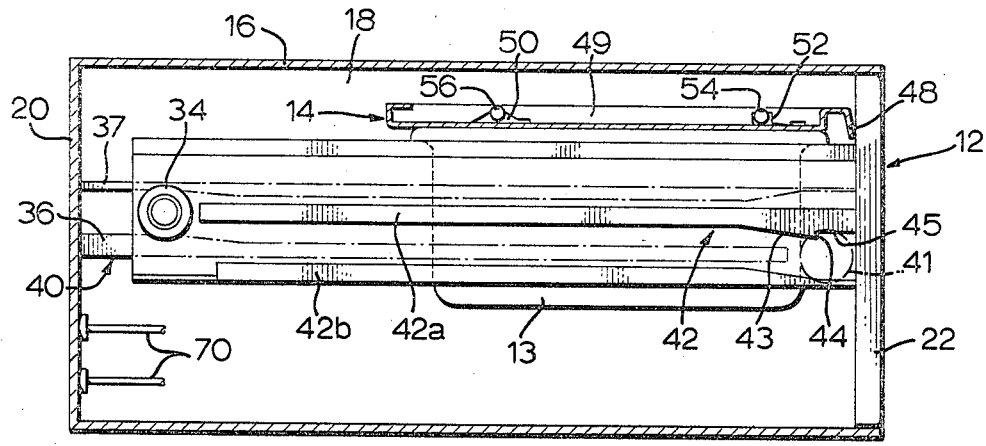
FIGURE 3 is a view similar to FIGURE 2, with the drawer closed.

The frame 10 has an upper panel 16, a lower panel 17, side panels 18, and a rear panel 20 (not visible in FIGURE 1, but shown in FIGURES 2 and 3).

The drawer 12 has a forward panel 22, carrying centrally a handle or grip 23. Two parallel, horizontal members 24 extend rearwardly from either side of the forward panel 22 of the drawer 12, and are held in parallel relation by a cross-member 26, which connects with the upper edge 27 of each member 24 so as to be flush therewith.

Figure 4:
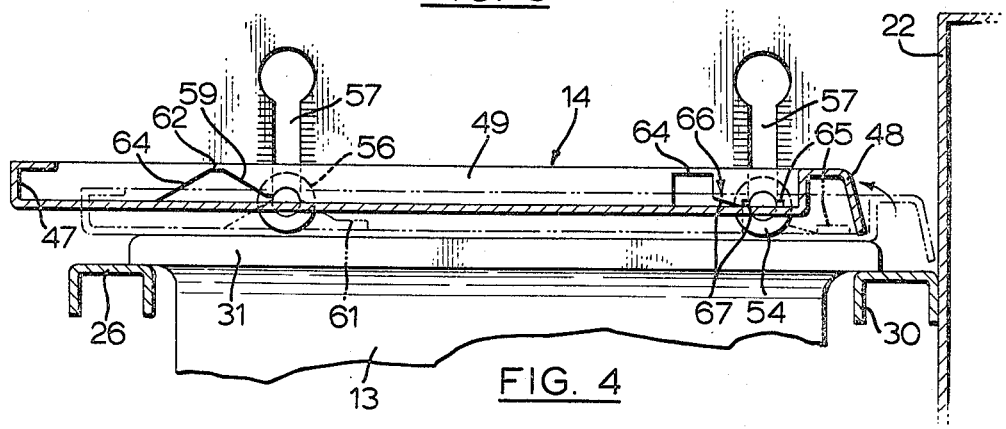
FIGURE 4 is a vertical sectional view, to a larger scale than FIGURE 3, of the lid employed in the warming oven.

A cross-member 30 similar to the cross-member 26 is positioned immediately rearwardly of the front panel 22 and, although not visible in FIGURE 1, is shown in dotted lines in FIGURE 2 and in solid cross-section in FIGURE 4. As best seen in FIGURE 4, the pan 13 has an outwardly protruding lip 32 which is adapted to rest on the cross-members 26 and 30. There can be one, two or more pans 13 as desired, although only one is shown in FIGURE 1. The outside edge of the lip 32 of a pan adjacent one of the horizontal members 24 is adapted to rest on the upper edge 27 of that horizontal member, as illustrated in FIGURE 1.

Cam and follower means are provided along the outside of each horizontal member 24 to permit the drawer to move in a horizontal path over most of its closure, but to cause the drawer to move rearwardly and upwardly over the final portion of its closure to attain its uppermost position when fully closed. To this end, there is provided, on each member 24, a first cam follower wheel 34 mounted toward the rear of each member 24. Mounted inside each side wall 18 of the frame 10 is a frame cam track 35, defined by an elongated sheet metal element 36. The two cam follower wheels 34 mounted on the drawer 12 are adapted to engage and travel along the frame cam tracks 35. There is also provided an upper sheet metal guide element 37, but since the wheels 34 bear against the lower elements 36, reference to the "tracks" 35 in the remainder of this specification and in the claims will indicate the elements 36 only. It will be noted in FIGURES 2 and 3 that the cam track 35 has, at the rear, a rearwardly and upwardly sloping portion 40, and it will be realized that the portion 40 will cause the cam follower wheel 34, and thus the rear of the drawer 12, to rise during the final portion of the closure of the drawer 12.

On each side wall 18 of the frame 10 there is mounted a second cam follower wheel 41 (only one visible in FIGURES 1, 2 and 3), and each of the wheels 41 is adapted to engage one of two drawer cam tracks 42, one of which is visible in each of FIGURES 1, 2 and 3. Although two metal elements 42a and 42b are disposed one on either side of each cam follower wheel 41, reference to the "tracks" 42 in the remainder of the specification and in the claims will indicate only the upper element 42, against which the cam follower wheel 41 bears. The cam tracks 42 are horizontal over most of their length, but each has a forwardly and downwardly sloping portion 43 at its forward end, such that the cam follower wheels 41, which are fixed to the frame 10, cause the portions 43, and thus the forward end of the drawer 12, to rise during the final portion of the closure of the drawer 12. At the bottom of the portions 43, each cam track 42 has a forward-facing step 44 adjacent a horizontal portion 45. The purpose of the step 44 is to keep the drawer 12 in the closed position due to gravity. FIGURE 3 shows the relation of the step 44 and the follower wheel 41 when the drawer 12 is closed.

It will thus be clear that the drawer 12 attains its uppermost position with respect to the frame 10 when it is fully closed.

The lid 14 is shown in FIGURES 1 to consist of a single rectangular piece of sheet metal 46 of which the edges have been bent to lend it rigidity and to allow certain shaped apertures to be cut therein. The rearward edge 47 is bent upwardly and forwardly. The forward edge 48, as seen in FIGURES 2, 3 and 4 is bent upwardly, forwardly and then downwardly at an angle. The side edges 49 are bent upwardly and inwardly, as best seen in FIGURE 1. Each of the bent side edges 49 of the lid 46 has a rearward aperture 50 and a forward aperture 52. Each side wall 18 of the frame 10 has a forward pin 54 and a rearward pin 56, vertically adjustable in the slots 57. Each rearward aperture 50 provides a cam edge 58 (see FIGURE 2) which consists of a portion 59 sloping upward to the rear between a forward lower portion 61 and a rearward upper portion 62 (see FIGURE 4). There is also a downwardly and rearwardly sloping portion 63 rearwardly of the portion 62, as shown in FIGURE 4.

Each aperture 52 provides a cam edge which has a rearward upper portion 64 and a forward lower portion 65, these two portions being separated by a downwardly projecting portion 66 with substantially vertical side walls 67 (see FIGURE 4).

When the lid 14 is situated such that the rearward upper portions 62 and 64 are resting on the pins 56 and 54 respectively, the lid 14 is in its forward, lowermost position, and this position is capable of adjustment by virtue of the slots 57 along which the pins 54 and 56 can be adjusted. When the lid 14 is in this position, it is such that the drawer 12, over the final portion of its closure, will rise up beneath the lid to bring the upper peripheral edge of the pan 13 into sealing contact with the bottom of the lid 14. As shown in FIGURE 2, the drawer 12 is in a partly open position and has dropped down away from the lid. Thus, the drawer 12 can traverse the rest of its opening motion without brushing against the lid 14. FIGURE 3 shows the drawer 12 in its closed position, and it can be seen that the lid 14 seats squarely against the upper edge of the pan 13.

It is this forward "down" position of the lid 14 which is used if it is desired to keep food items, such as freshly baked rolls, etc., in a warm, moist state. The lid 14, sealing squarely against the upper edge of the pan 13, tends to prevent the moisture contained within the food items from escaping, due to the confined space constituted by the inside of the pan 13. However, if it is desired to permit a food item such as a freshly baked roll or loaf of bread to dry to some extent, and become "crisp," the lid 14 is moved to its upper, rearward position, shown in solid lines in FIGURE 4, by manually grasping the forward edge 48 of the lid 14, raising it to clear the rearward side wall 67 of the downward projection 66, and shoving it rearwardly to cause the sloping portion 59 of the rearward aperture to ride up along the pin 56, thereby raising the rearward portion of the lid 14, and at the same time bringing the portion 65 of the forward aperture directly over the forward pin 54. FIGURE 4 shows in ghost lines the position of the lid 14 when it is down against the pan 13. Because of the arrangement of the pins 54 and 56 and the apertures 50 and 52, the lid 14 can be easily removed from the frame 10 merely by lifting the forward edge 48 and pulling. No tools are required for this removal. The downwardly and rearwardly sloping portion 63 of the aperture 50 permits the rearward end of the lid 14 to ride up over the rearward pin 56 when the lid 14 is being removed.

An electrically powered heating element 70 is provided to warm the inside of the frame 10 enclosing the drawer 12 and pan 13. Certain other means adapted to maintain the pan at the desired temperature will be familiar to those versed in this art, and these alternative means are to be considered within the scope of this invention.

It will be realized that a single frame enclosure can contain several drawers 12, and that all the pans contained in the several drawers can be heated from a single source, such as the heating element 70.

While a preferred embodiment of this invention has been disclosed herein, those skilled in the art will appreciate that changes and modifications may be made therein without departing from the spirit and scope of this invention.

What we claim as our invention is:
1. A warming oven comprising:
   a frame,
   a drawer supported by said frame,
   cam and follower means mounting the drawer on the frame, the cam and follower means being such that the drawer moves rearwardly and upwardly over the final portion of its closure to attain its uppermost position when fully closed,
   an open-topped container in said drawer,
   a container lid carried by said frame cam and follower means mounting the container lid within said frame such that said lid is accessible when said drawer is open and is displaceable from a first fixed lower position in which it substantially seals said container when the drawer is fully closed, to a second fixed upper position in which it is spaced from said container when the drawer is fully closed,
   and means for heating said container.

2. A warming oven as claimed in claim 1, in which said cam and follower means includes, on each side of said drawer:
   a first cam follower wheel mounted on the drawer toward the rear of the drawer,
   a first cam track mounted on the frame and adapted to be engaged by said first cam follower wheel, said first cam track having at the rear a rearwardly and upwardly sloping portion, said portion causing said first cam follower wheel and thus the rear of the drawer to rise during the final portion of the closure of the drawer,
   a second cam follower wheel mounted on the frame in a position adjacent the forward end of the drawer when the latter is closed,
   and a second cam track mounted on the drawer and adapted to be engaged by said second cam follower wheel, said second cam track having a forwardly and downwardly sloping portion at its forward end, such that the second cam follower wheel causes said forwardly and downwardly sloping portion and thus the forward end of the drawer to rise during the final portion of the closure of the drawer.

3. A warming oven as claimed in claim 2, in which the second cam track has a further portion forwardly of said forwardly and downwardly sloping portion, said further portion being separated from said forwardly and downwardly sloping portion by a downward projection extending below the level of said further portion, said downward projection being so positioned as to bear downwardly against the rear of said second cam follower wheel when the drawer is closed, thereby to bias the drawer into its closed position.

4. A warming oven as claimed in claim 1 in which the cam and follower means mounting the container lid within the frame comprises a pair of spaced cam edges of like configuration arranged at each side edge of said lid, resting respectively upon forward and rearward pins attached to said frame, the cam edges having a configuration such that the lid can be moved manually from said first fixed lower position to said second fixed upper position by lifting the forward edge of the lid and pushing the lid rearwardly.

5. A warming oven as claimed in claim 4, in which, for each side edge of the lid, the cam edge resting on the rearward pin has a portion sloping upward to the rear between a forward lower portion and rearward upper portion, and the cam edge resting on the forward pin has a rearward upper portion and a forward lower portion separated by a downwardly projecting portion with substantially vertical side walls.

6. A warming oven as claimed in claim 4, in which said forward and rearward pins are vertically adjustable with respect to the frame.

7. A warming oven as claimed in claim 5, in which the cam edge resting on the rearward pin has a further portion sloping downward to the rear from said rearward upper portion, thereby to permit the rearward edge of the lid to ride up over said rearward pin for forward removal of the lid from the frame.

8. A warming oven as claimed in claim 5, in which said cam and follower means includes, on each side of said drawer:
- a first cam follower wheel mounted on the drawer toward the rear of the drawer,
- a first cam track mounted on the frame and adapted to be engaged by said first cam follower wheel, said first cam track having at the rear a rearwardly and upwardly sloping portion, said portion causing said first cam follower wheel and thus the rear of the drawer to rise during the final portion of the closure of the drawer,
- a second cam follower wheel mounted on the frame in a position adjacent the forward end of the drawer when the latter is closed,
- and a second cam track mounted on the drawer and adapted to be engaged by said second cam follower wheel, said second cam track having a forwardly and downwardly sloping portion at its forward end, such that the second cam follower wheel causes said forwardly and downwardly sloping portion and thus the forward end of the drawer to rise during the final portion of the closure of the drawer.

9. A warming oven as claimed in claim 1, in which the frame is constructed as an enclosure about the drawer and the lid, and in which said means for heating is an electrically powered heating element within said enclosure.

References Cited

UNITED STATES PATENTS

| | | | |
|---|---|---|---|
| 1,906,723 | 5/1933 | Rosendahl | 312—270 |
| 2,565,845 | 8/1951 | Frederick | 312—270 X |
| 2,912,293 | 11/1959 | Jung | 312—246 X |
| 2,942,926 | 6/1960 | Pavelka | 312—270 |
| 3,272,580 | 9/1966 | Dean et al. | 312—270 X |

JAMES T. McCALL, Primary Examiner

U.S. Cl. X.R.

312—330